United States Patent [19]

Arai

[11] Patent Number: 5,486,852
[45] Date of Patent: Jan. 23, 1996

[54] CAMERA-INTEGRATED VIDEO RECORDER SYSTEM HAVING MOUNTABLE AND DEMOUNTABLE REMOTE-CONTROL UNIT

[75] Inventor: Takashi Arai, Tokyo, Japan

[73] Assignee: Canon Kabushiki Kaisha, Tokyo, Japan

[21] Appl. No.: 85,131

[22] Filed: Jun. 29, 1993

Related U.S. Application Data

[63] Continuation of Ser. No. 699,205, May 13, 1991, abandoned.

[30] Foreign Application Priority Data

May 22, 1990 [JP] Japan .................................... 2-132892

[51] Int. Cl.⁶ .......................... H04N 5/225; H04N 5/232
[52] U.S. Cl. ........................................... 348/211; 348/220
[58] Field of Search ............................. 358/210, 213.13, 358/229, 909, 335, 906; 348/207, 211, 373, 374, 375, 376, 220; H04N 5/30, 5/225, 5/232

[56] References Cited

U.S. PATENT DOCUMENTS

| 4,450,487 | 5/1984 | Koide | 358/335 |
| 4,470,077 | 9/1984 | Komine | 358/335 |
| 4,837,817 | 6/1989 | Maemori | 358/224 |
| 5,381,179 | 1/1995 | Kashimura | 348/211 X |

FOREIGN PATENT DOCUMENTS

61-42627  3/1986  Japan ............................. H04B 1/04

*Primary Examiner*—Wendy R. Greening
*Attorney, Agent, or Firm*—Robin, Blecker, Daley & Driscoll

[57] ABSTRACT

A camera-integrated video recorder system having a remote-control unit arranged to be detachably mountable thereon is provided with a switching circuit, which is arranged to switch the operation mode of the system between a camera shooting mode and a video recorder mode in association with an operation of mounting or demounting the remote-control unit on or from the camera body of the system.

14 Claims, 6 Drawing Sheets

CAMERA-INTEGRATED VIDEO RECORDER SYSTEM HAVING MOUNTABLE AND DEMOUNTABLE REMOTE-CONTROL UNIT

This is a continuation application under 37 CFR 1.62 of prior application Ser. No. 699,205, filed May 13, 1991 now abandoned.

BACKGROUND OF THE INVENTION

1. Field of the Invention

This invention relates to a camera-integrated video recorder system (VTR) which is arranged to permit a remote operation thereon by means of a remote-control unit.

2. Description of the Related Art

The camera-integrated VTRs are generally arranged to have two functions including picture taking by means of a camera and reproduction by means of a VTR. Each of these different operation modes is arranged to be selectable by changing them from one over to the other with a change-over switch which is provided on the body of the camera-integrated VTR.

Meanwhile, the number of camera-integrated VTRs having remote-control units which permit remote operations for enhancement of their operability is increasing in recent years.

Figure 1:
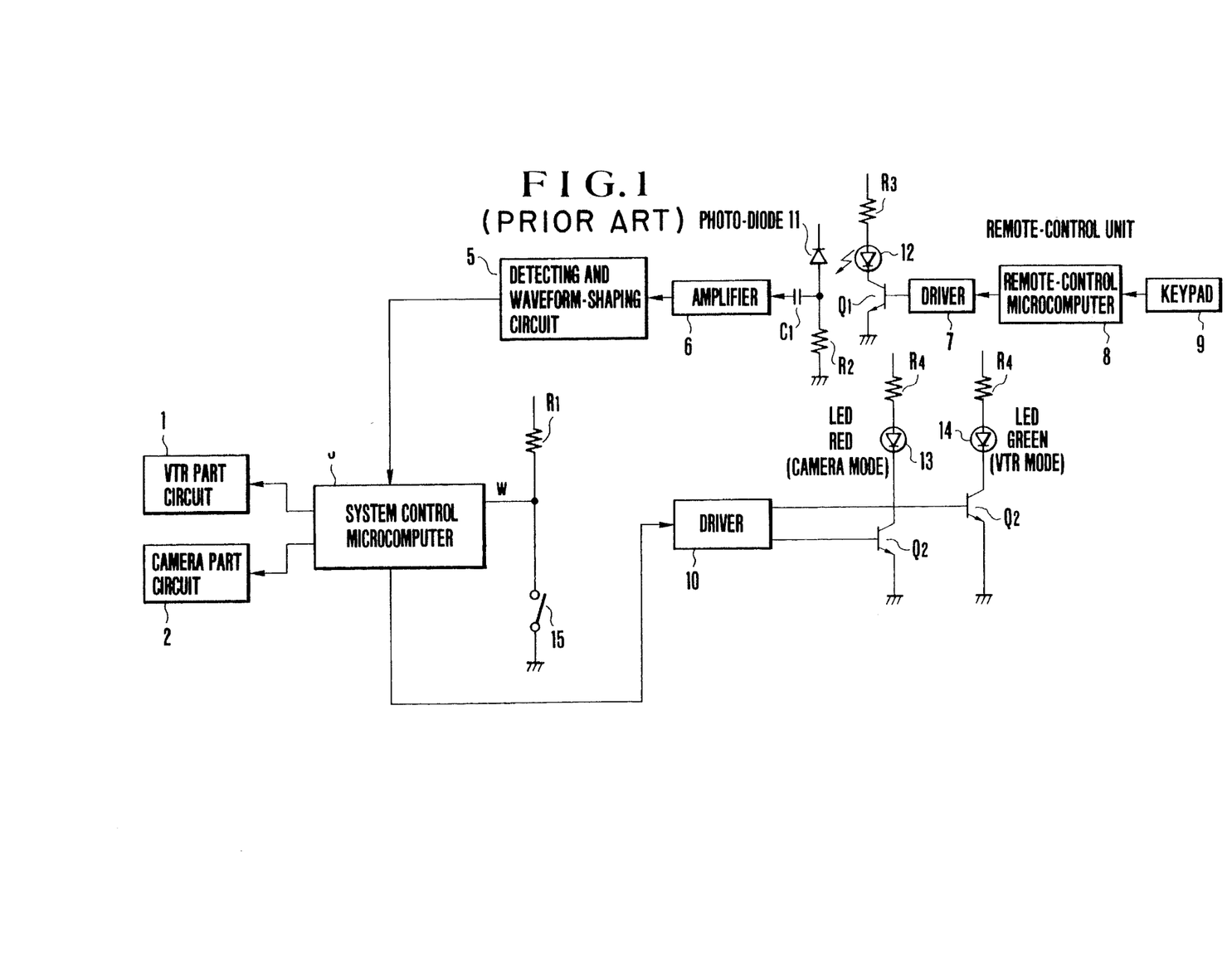
FIG. 1 is a block diagram showing an example of the conventional system.

FIG. 1 shows in a block diagram a camera-integrated VTR of the above-stated kind. The illustration includes a VTR part circuit 1; a camera part circuit 2; a system control microcomputer 3 which performs overall control for functions of varied kinds; a detecting and waveform-shaping circuit 5; an amplifier 6; a driver 7 for driving an infrared ray emitting LED; a remote-control microcomputer 8 which controls a remote-control unit; a keypad 9 for remote control; a driver 10 which drives indication LEDs; a photodiode 11 which is provided on the side of the VTR body for receiving a remote-control light; an infrared ray emitting LED 12 which emits infrared rays for signal transmission; an LED 13 which indicates a camera mode, by emitting, for example, a red light; an LED 14 which indicates a VTR mode by emitting, for example, a green light; and a mode change-over switch 15.

Figure 2:
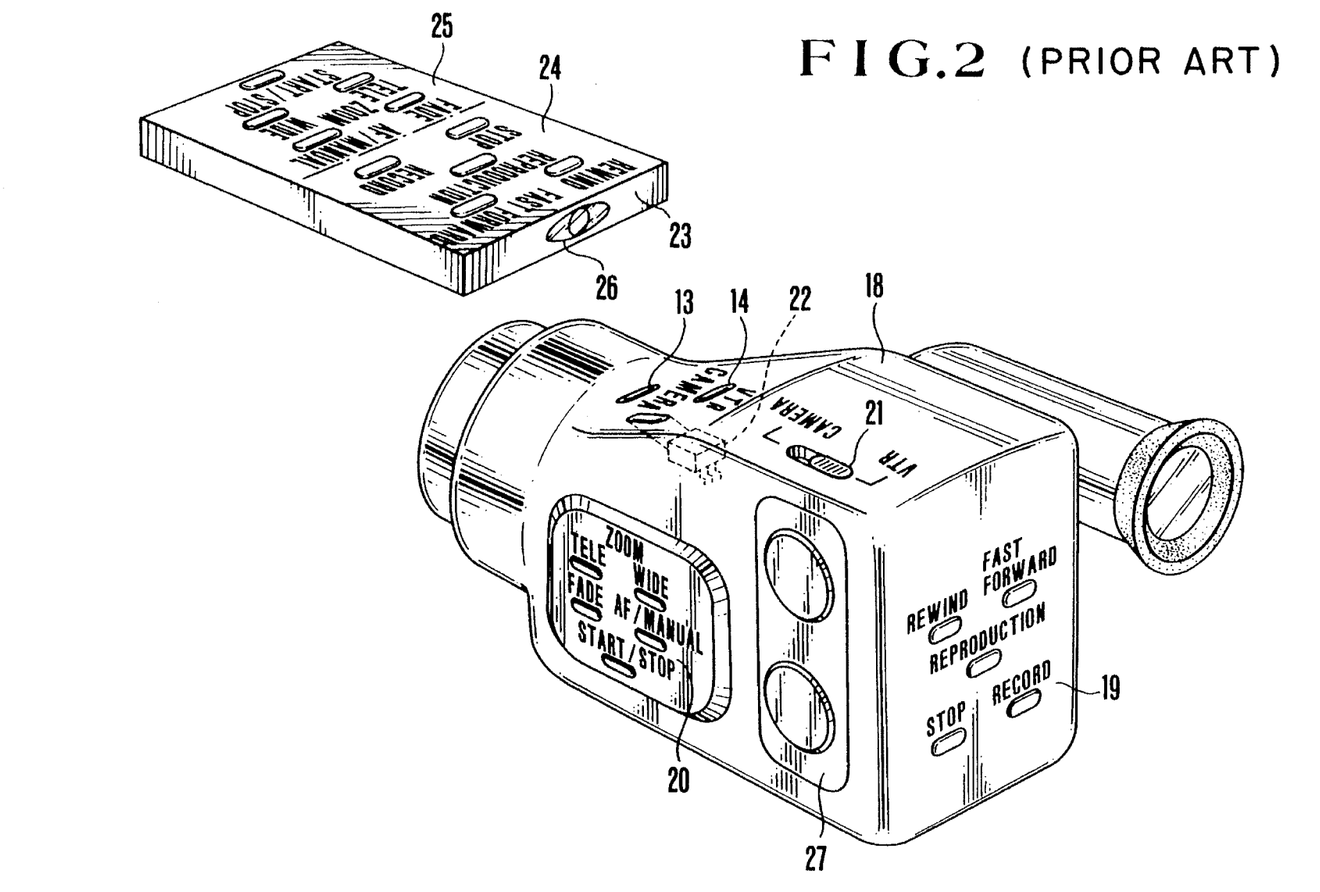
FIG. 2 is an oblique view of the conventional system.

FIG. 2 shows in an oblique view an example of the conventional camera-integrated VTR. In FIG. 2, a reference numeral 18 denotes a body of the camera-integrated VTR (hereinafter referred to as the camera body). Operation keys 19 of a VTR system are provided for rewinding a tape, fast forwarding the tape, reproduction, stop recording, etc. Operation keys 20 of a camera system are provided for zooming, fading, automatic focusing (AF)/manual focusing change-over, etc. A VTR/camera change-over button 21 is interlocked with the mode change-over switch 15. A light receiving unit 22 has a light receiving circuit for receiving infrared rays from a remote-control unit. A reference numeral 23 denotes the remote-control unit. Numerals 24 and 25 respectively denote operation keys provided for the VTR system and the camera system. A numeral 26 denotes an infrared ray emitting diode window for signal transmission. Further, the LEDs 13 and 14 provided for indicating the camera mode and the VTR mode, respectively, are disposed in positions as shown in FIG. 2.

The example of the conventional camera-integrated VTR operates as follows: the operation of the camera-integrated VTR as a whole is controlled by the system control microcomputer 3. Data communication is incessantly maintained between the VTR part circuit 1 and the camera part circuit 2. When the switch 15 is turned on or off, the level of a signal w is changed over to a low or high level due to a predetermined voltage level supplied via a resistor R1. This signal w is supplied to the system control microcomputer 3. This enables the system control microcomputer 3 to detect the state of the switch 15. When the switch 15 is turned on, the camera-integrated VTR is set in a camera shooting mode (hereinafter referred to as a camera mode). The camera-integrated VTR system is set in a video recorder mode (hereinafter referred to as a VTR mode) when the switch 15 is turned off. In the VTR mode, the record on a recorded tape is reproduced; and the tape is fast forwarded or rewound. In the camera mode, motor-driven actions of zooming, fading, starting or stopping a recording operation, etc., are performed. In one of these modes, the functions of the other mode are arranged so that it is impossible to prevent a faulty operation.

To enable the operator to readily know the mode in which the camera-integrated VTR is currently set, the driver 10 is arranged to be controlled to light up the red LED 13 in the camera mode and to light up the green LED 14 in the VTR mode. The change in the mode is thus arranged to be indicated by the change of color of light emission. These mode indicating LEDs 13 and 14 are located in positions to be seen from the front of the camera body as shown in FIG. 2.

Next, the infrared wireless remote-control unit is described as follows:

Referring to FIG. 1, when the remote-control keypad 9 is pushed, the microcomputer 8 for remote control acts to generate given digital data. With the data generated, the driver 7 causes the infrared ray emitting LED 12 to operate. An infrared light which is capable of reaching a given distance is emitted by the LED 12 to send to the camera body data according to the operation on the keypad 9. Then, on the side of the camera body 18, the infrared light signal from the remote-control unit 23 is received by the photodiode 11. The signal is amplified by the amplifier 6 and, after that, is detected and has its waveform shaped by the detecting and waveform-shaping circuit 5. The system control microcomputer 3 then performs a data reading action. Then, the microcomputer 3 performs data communication to carry out a predetermined action with the VTR part 1 and the camera part 2 on the basis of the data received.

However, in the case of the conventional camera-integrated VTR, the camera mode and the VTR mode are changed from one over to the other by means of the VTR/camera change-over button 21 (the mode change-over switch 15). After the change-over, therefore, it is confusing and not easy for an unaccustomed operator to clearly know which of the operation keys is operable and which is not.

SUMMARY OF THE INVENTION

To solve the above-stated problem, it is an object of this invention to provide a camera-integrated video recorder system having a remote-control unit which is detachably mounted on the system, in which switching between a camera shooting mode (camera mode) and a video recorder mode (VTR mode) is performed in association with the action of mounting or demounting the remote-control unit on or from a body of the system.

Under this object, a camera-integrated video recorder system which is an embodiment of the invention is arranged to be capable of clearly distinguishing an operable operation key from an inoperable operation key in a currently set operation mode, so that a faulty operation on the system can be effectively prevented.

The above and other objects and features of the invention will become apparent from the following detailed description of embodiments thereof taken in connection with the accompanying drawings.

DETAILED DESCRIPTION OF THE PREFERRED EMBODIMENTS

Figure 3:
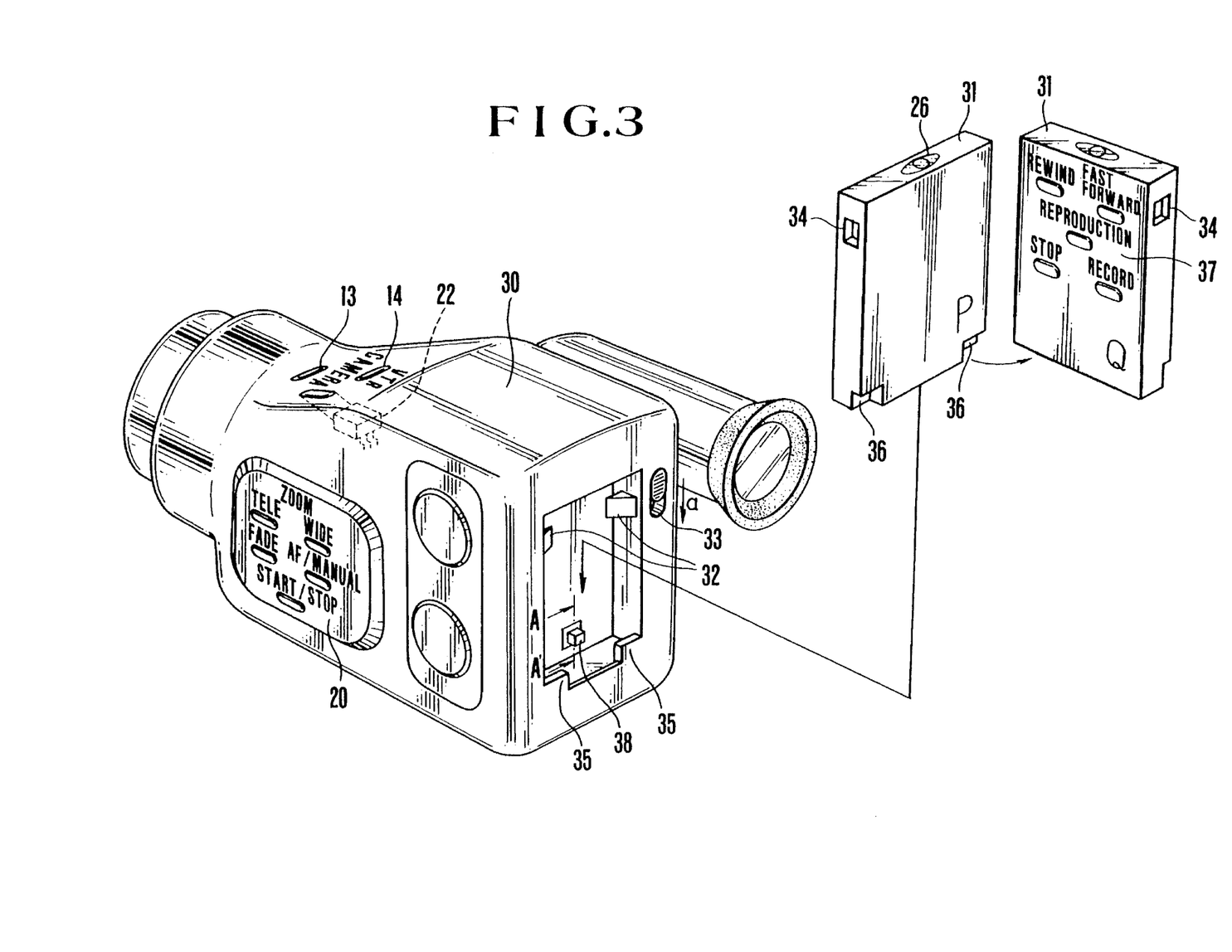
FIG. 3 is an oblique view showing a first embodiment of this invention.

The following describes the details of the camera-integrated video recorder system of this invention through embodiments thereof with reference to the accompanying drawings:

FIG. 3 shows in an oblique view a first embodiment of the invention. The illustration includes a body 30 of the camera-integrated VTR (hereinafter referred to as a camera body); and a remote-control unit 31. Lock claws 32 are provided for locking the remote-control unit 31 to a remote-control-unit stowing part of the camera body 30. A remote-control-unit unlocking lever 33 is arranged to release the remote-control unit 31 from its locked state. Lock holes 34 are formed in the side faces of the remote-control unit 31 and arranged to engage the lock claws 32. Keep ribs 35 are provided for keeping the remote-control unit 31. Remote-control-unit keep grooves 36 are arranged to engage the remote-control-unit keep ribs 35. VTR operation keys 37 are provided on the side of the remote-control unit 31. A VTR/camera change-over switch 38 is provided for selection of the VTR mode or the camera mode.

Figures 4, 5:
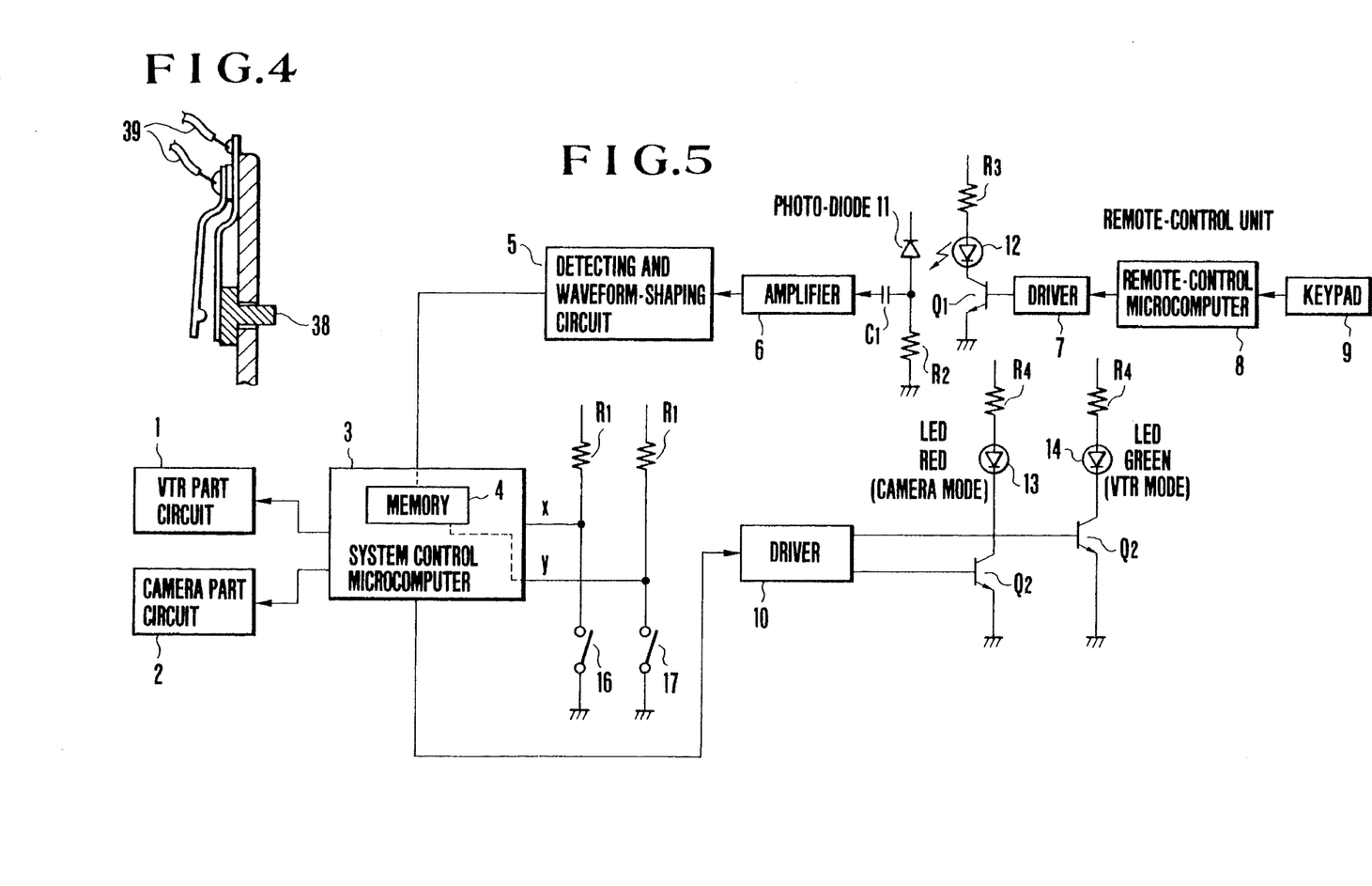
FIG. 4 is a sectional view taken along a line A-A' shown in FIG. 3.
FIG. 5 is a block diagram showing a second embodiment of the invention.

The block arrangement of the camera-integrated VTR and its circuit operation are basically the same as the conventional system shown in FIG. 1. However, in the case of the first embodiment shown in FIG. 3, the switch 15 of FIG. 1 is replaced with the VTR/camera change-over switch 38. FIG. 4 is a sectional view of the switch 38 taken along a line A-A' of FIG. 3. In FIG. 4, a reference numeral 39 denotes lead wires which are connected to the circuit arrangement of the camera body 30.

The system which is arranged as described above operates as follows: as shown in FIG. 3, the remote-control unit 31 is provided only for the VTR mode and thus has only the VTR operation keys 37 which are disposed on one side Q thereof. The remote-control units of the camera-integrated VTRs are generally arranged to have operation functions both for the camera and VTR modes. However, some products on the market are arranged to omit the camera operation keys, because in actuality, the remote-control unit is used mostly for operating the VTR system, particularly in the case of a beginner operator.

The remote-control unit 31 of this embodiment is arranged to be of the latter kind having only the keys for operating the VTR system.

Again referring to FIG. 3, the remote-control unit 31 is arranged to be mounted on the rear side of the camera body 30. With the remote-control unit 31 mounted by adjusting the remote-control-unit keep grooves 36 of the remote-control unit 31 to the remote-control-unit keep ribs 35 of the camera body 30, the lock claws 32 enter the lock holes 34 provided on two sides of the remote-control unit 31, so that the remote-control unit 31 can be secured to the camera body 30.

The lock claws 32 are urged and caused to always protrude outward from side walls by springs or the like. These claws 32 are arranged to be sinkable into the side walls by sliding the remote-control-unit unlocking lever 33 in the direction of arrow "a". In removing the remote-control unit 31, therefore, the remote-control unit 31 can be taken out by pulling it backward while leaving the remote-control-unit unlocking lever 33 in a slidden position.

Further, with the remote-control unit 31 in the state of being mounted on the camera body 30, the VTR/camera change-over switch 38 is pushed and turned on by the surface Q of the remote-control unit 31. As mentioned in the foregoing, the electrical function itself of the VTR/camera change-over switch 38 corresponds to the switch 15 of FIG. 1. When it is in an on-state, the system is in the camera mode like in the case of the switch 15. Therefore, the operating mode of the system becomes the camera mode when the remote-control unit 31 is mounted on the camera body 30 and the VTR mode when the remote-control unit 31 is removed from the camera body 30.

In the embodiment described, its operating mode is arranged to be changed by a mounting or demounting action performed on the remote-control unit. Therefore, the mode of the embodiment becomes distinct. The operability of the system can be greatly enhanced as the VTR operation keys become invisible from outside in the camera mode to prevent any confused and faulty operation on the operation keys to be operated and not to be operated.

Figure 7:
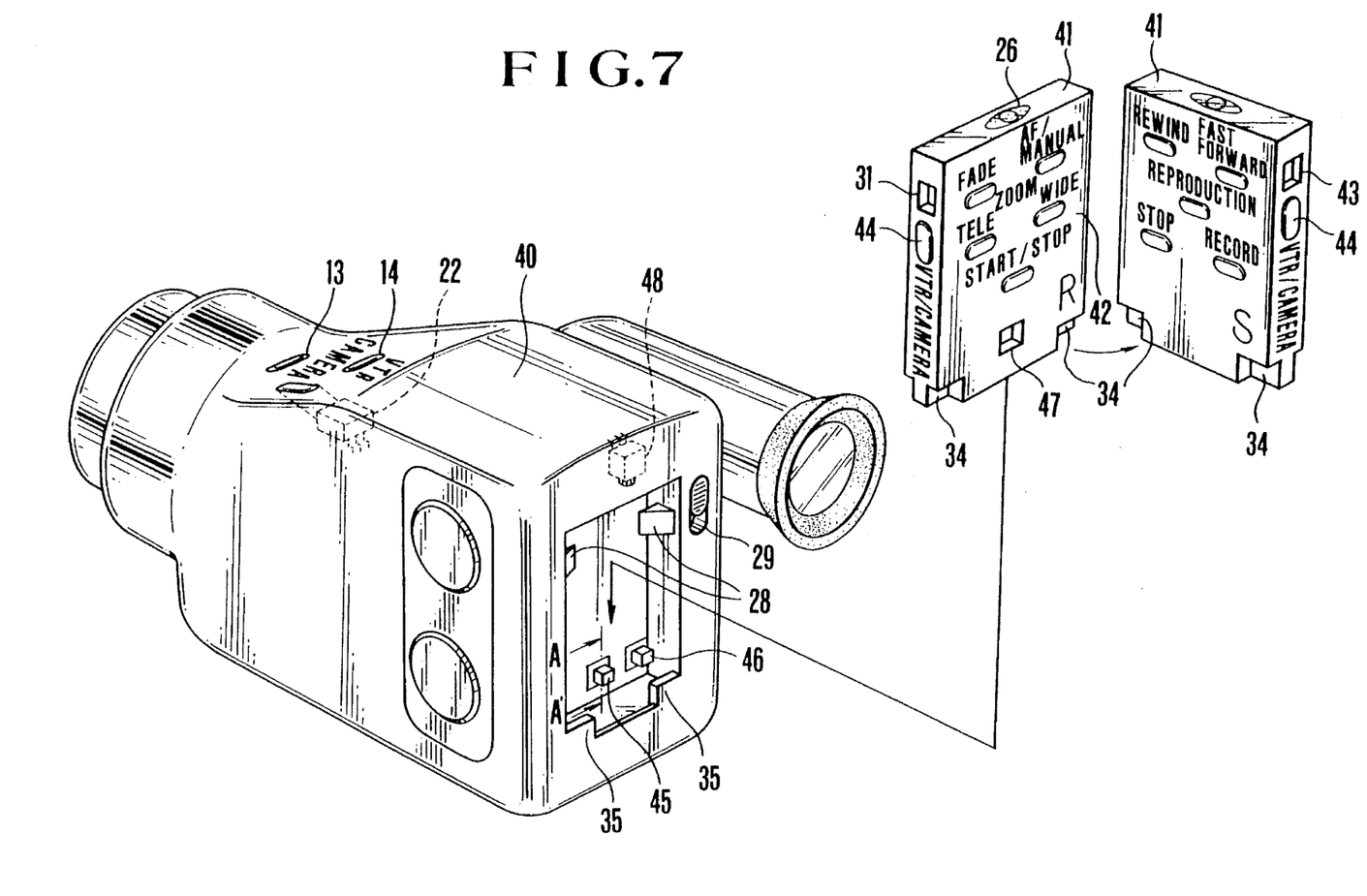
FIG. 7 is an oblique view showing the second embodiment.

Next, a second embodiment of the invention is described as follows: FIG. 7 is an oblique view showing a camera-integrated video recorder system which is arranged according to this invention as the second embodiment thereof. In FIG. 7, the same component parts as those of the first embodiment shown in FIG. 3 are indicated by the same reference numerals. Referring to FIG. 7, the illustration includes a body 40 of the camera-integrated VTR (the camera body); a remote-control unit 41; camera operation keys 42; VTR operation keys 43; a VTR/camera mode change-over button 44; a VTR/camera change-over switch 45; a remote-control-unit mounting/demounting detecting switch 46; and an infrared light receiving unit 48.

FIG. 5 is a block diagram showing the circuit arrangement of the second embodiment. The illustration includes a state detecting memory 4; a mode change-over switch 16; and a remote-control-unit mounting/demounting detecting switch 17. The arrangement and the operation of the second embodiment are described as follows:

Referring to FIG. 7, the remote-control unit 41 has two operating functions for both the camera system and the VTR system. It has the camera operation keys 42 arranged on one surface R and the VTR operation keys 43 on the other surface S. In other words, the remote-control unit 41 is provided with operation keys on both surfaces thereof. Further, the VTR/camera mode change-over button 44 is disposed and arranged on one side surface to permit remote operation of either the camera system or the VTR system.

Further, remote-control-unit keep grooves 34 are provided on both surfaces of the remote-control unit 41. Therefore, the remote-control unit 41 can be mounted on the camera body 40 with either of the surfaces R and S exposed to the outside. Further, on the surface R is disposed a detection hole 47 which is arranged in such a way as to prevent the VTR/camera change-over switch 45 from being pushed by the surface R and thus to leave it in an off-state when the remote-control unit 41 is mounted on the camera body 40 with the surface R positioned on the inner side. Whereas, the remote-control-unit mounting/demounting detecting switch 46 is arranged to be turned on when the remote-control unit 41 is mounted on the camera body 40 with either of the surface R or the surface S positioned on the inner side.

The camera body 40 has the infrared light receiving unit 48 disposed in a place where the remote-control unit 41 is to be mounted. The infrared light receiving unit 48 is thus arranged to be capable of receiving the infrared rays (light) from an infrared ray emitting diode window 26 which is disposed on the side of the remote-control unit 41. Such being the arrangement, the second embodiment permits the operation keys of the remote-control unit 41 appearing on the outer side thereof to be operated as they are with the remote-control unit 41 left in the state of being mounted on the camera body 40. Therefore, this arrangement dispenses with the camera operation keys 20 which are disposed on the camera body 30 in the case of the first embodiment.

Further, the means for mounting the remote-control unit 41 and the remote operating light receiving unit 22 and the mode indicating LEDs 13 and 14 are arranged in the same manner as in the case of the first embodiment.

The arrangement of the second embodiment shown in the block diagram of FIG. 5 differs from the conventional system of FIG. 1 in the following points:

In the first place, the second embodiment has two mode selection switches, instead of one, including the switch 16 and the switch 17. The former is arranged to be operated by the VTR/camera change-over switch 45 of FIG. 7 and the latter by the remote-control-unit mounting/demounting detecting switch 46 respectively. The memory 4 is added to the system control microcomputer 3. The memory 4 is alternately set and reset every time the VTR/camera mode change-over button 44 is pushed. Further, the memory 4 is arranged to be always reset when the switch 17 (remote-control-unit mounting/demounting detecting switch 46) is in an on-state.

Figure 6:
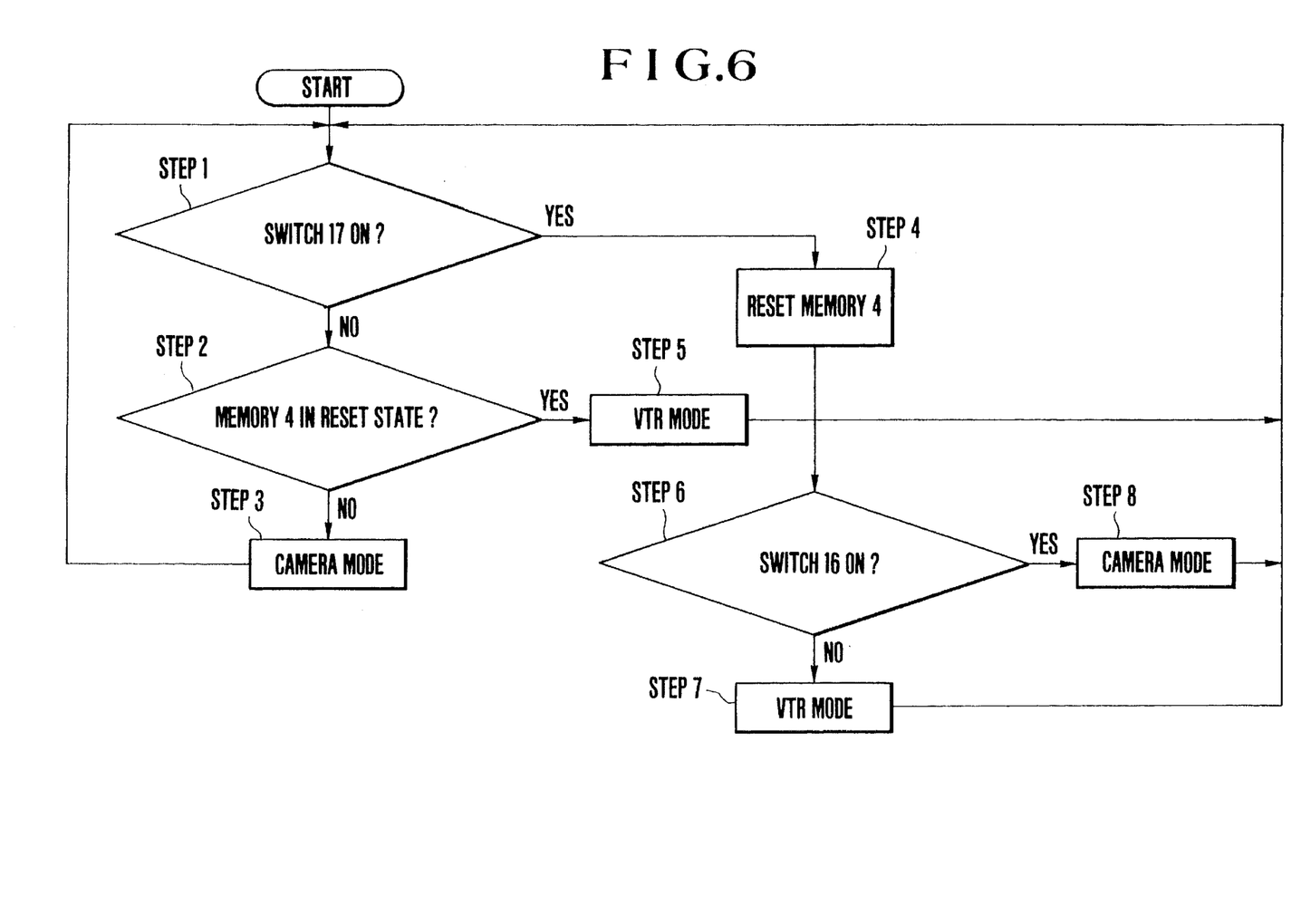
FIG. 6 is a flow chart showing the operation of the second embodiment of the invention.

Referring to FIG. 6 which is a flow chart, the operation of the system control microcomputer 3 is described as follows: at a step 1, a check is made for the state of the switch 17. If the switch 17 (remote-control-unit mounting/demounting detecting switch 46) is found to be in an on-state, the flow of operation comes to a step 4 to reset the memory 4. The flow then comes to a step 6 to read the state of the switch 16 (VTR/camera change-over switch 45). If the switch 16 is found in an on-state, the flow comes to a step 8 to set the system in the camera mode. If the switch 16 is in an off-state, the flow comes to a step 7 to set the system in the VTR mode. In other words, when the remote-control unit 41 is mounted on the camera body 40, the memory 4 is reset without fail. If the remote-control unit 41 is mounted with the camera operation keys 42 on the outer surface, the system is set in the camera mode. If it is mounted with the VTR operation keys 43 on the outer surface, the system is set in the VTR mode.

Next, if the switch 17 (remote-control-unit mounting/demounting detecting switch 46) is found to be in an off-state, the flow proceeds to a step 2 to read the state of the memory 4. If the memory 4 is found in a reset state, the flow comes to a step 5 to set the system in the VTR mode. If the memory 4 is in a set state, the flow comes to a step 3 to set the system in the camera mode.

In other words, the mode of the system always becomes the VTR mode immediately after the remote-control unit 41 is detached from the camera body 40 as the memory 4 is then in a reset state without fail. Under this condition, when the VTR/camera mode change-over button 44 is pushed once by the remote operation of the remote-control unit 41, the memory 4 is set to bring the system into the camera mode. When the change-over button 44 is pushed once more, the system comes back to the VTR mode. The system thus changes from one mode over to the other every time the change-over button 44 is pushed.

In using the remote-control unit 41 by mounting it on the camera body 40, the mode of the system is automatically changed from one mode over to the other by changing the mounting side of the unit 41 from one side over to the other as described above. In this instance, only the operation keys that are usable in the mode thus obtained are allowed to appear on the outside. Immediately after the remote-control unit 41 is demounted, the system always becomes the VTR mode in which the frequency of the remote operation is high. However, if necessary, the VTR mode can be changed over to the camera mode by means of the button 44 provided on the side of the remote-control unit 41.

This arrangement not only greatly enhances the operability of the system by preventing any confusion in operating the operation keys according to the mode but also permits reduction in the number of operation keys to be provided on the camera body. Therefore, the system can be arranged to have a simpler external shape.

As mentioned in the foregoing description, the embodiment permits mounting and demounting the remote-control unit on and from the camera body and effects mode change-over in association with mounting and demounting actions. The invented arrangement not only greatly enhances the operability of the camera-integrated VTR but also enables any operator unaccustomed to the operation to operate it without making any error. The intrinsic advantageous effect of the remote-control unit which resides in improved operability thus can be fully attained in accordance with the invention.

What is claimed is:

1. A camera-integrated video recorder system having an operation switch for a camera shooting mode and an operation switch for a video recorder mode, comprising:
   a) a system body;
   b) a remote-control unit which is detachably mountable on said system body; and
   c) change-over means for switching between a camera shooting mode and a video recorder mode in association with an operation of mounting and demounting said remote-control unit on or from said system body, wherein only said operation switch for the camera shooting mode is usable when said remote-control unit is mounted on said system.

2. A system according to claim 1, wherein said change-over means is disposed in a remote-control-unit mounting part of said system body.

3. A system according to claim 1, wherein said operation switch for the camera shooting mode is disposed on said system body.

4. A system according to claim 3, wherein said operation switch for the video recorder mode is disposed on said remote-control unit, and wherein, when said remote-control unit is mounted on said system body, said operation switch for the video recorder mode does not externally appear.

5. A camera-integrated video recorder system having an operation switch for a camera shooting mode and an operation switch for a video recorder mode, both being provided only on a remote-control unit, comprising:

a) a system body; and b) said remote-control unit being of a type which is arranged to be detachably mountable on said system body, wherein said operation switch for the camera shooting mode and said operation switch for the video recorder mode are disposed on different surfaces of said remote-control unit.

6. A camera-integrated video recorder system comprising:

a) a system body;

b) a remote-control unit which is detachably mountable on said system body and is provided with an operation switch for a camera shooting mode and an operation switch for a video recorder mode; and c) change-over means for switching between said camera shooting mode and said video recorder mode in association with an operation of mounting and demounting said remote-control unit on or from said system body, wherein, of said operation switches for the camera shooting mode and for the video recorder mode, only said operation switch for the video recorder mode is usable immediately after said remote-control unit is demounted from said system body.

7. A system according to claim 6, wherein said change-over means is disposed in a remote-control-unit mounting part of said system body.

8. A system according to claim 6, wherein signal transmission from said remote-control unit to said system body is always performed in a wireless manner.

9. A camera-integrated video recorder system comprising:

a) a system body;

b) a remote-control unit which is detachably mountable on said system body and is provided with an operation switch for a camera shooting mode and an operation switch for a video recorder mode; and c) change-over means for switching between said camera shooting mode and said video recorder mode in association with an operation of mounting and demounting said remote-control unit on or from said system body, wherein said operation switch for the camera shooting mode and said operation switch for the video recorder mode are disposed on different surfaces of said remote-control unit.

10. A system according to claim 9, wherein only either one of said operation switches is arranged to externally appear when said remote-control unit is mounted on said system body.

11. A system according to claim 10, wherein said change-over means includes:

(i) first detecting means for detecting which of said operation switches externally appears on said system body; and (ii) second detecting means for detecting whether said remote-control unit is mounted on said system body;

wherein said change-over means switch between said camera shooting mode and said video recorder mode in response to the results of detecting of said first detecting means and said second detecting means.

12. An electronic apparatus comprising:

a) an apparatus body having at least one operation member thereon, said apparatus body including a video camera and a video recorder;

b) an operation unit which is mountable and demountable on and from said apparatus body, said operation unit including a remote control unit; and c) operation mode control means for changing, according to an operation of mounting and demounting said operation unit on or from said apparatus body, a first operation mode which is controllable by only said at least one operation member on said apparatus body, over to a second operation mode which is controllable by only said operation unit, wherein only said second operation mode is set immediately after said operation unit is demounted from said apparatus body, said operation mode control means being arranged to switch a camera mode and a video recorder mode over from one to the other according to an operation of mounting and demounting said remote-control unit.

13. An electronic apparatus comprising:

a) an apparatus body, said apparatus body including a camera-integrated video recorder;

b) an operation unit which is mountable and demountable on and from said apparatus body, said operation unit having a plurality of mounting portions capable of being mounted on said apparatus body; and c) operation mode control means for changing, according to a mounted state of said operation unit on said apparatus body, an operation mode of said apparatus body over from one mode to another immediately after said operation unit is mounted on said apparatus body, said operation mode control means being arranged to switch said camera-integrated video recorder between a camera mode and a video recorder mode.

14. An electronic apparatus comprising:

a) an apparatus body;

b) an operation unit which is mountable and demountable on and from said apparatus body, said operation unit having a plurality of mounting portions capable of being mounted on said apparatus body and a plurality of operation surfaces provided with operation switches; and c) operation mode control means for changing, according to a mounted state of said operation unit on said apparatus body, an operation mode of said apparatus body over from one mode to another immediately after said operation unit is mounted on said apparatus body, said operation mode control means being arranged to automatically change, when said operation unit is mounted on said apparatus body, the operation mode of said apparatus body to an operation mode in which said apparatus body is controllable by the operation switch which is disposed on one of said operation surfaces and is externally operable with said operation unit mounted on said apparatus body.

* * * * *